United States Patent
Gloeckner et al.

(10) Patent No.: US 7,144,975 B2
(45) Date of Patent: *Dec. 5, 2006

(54) UNSATURATED AMORPHOUS POLYESTERS BASED ON CERTAIN DICIDOL ISOMERS

(75) Inventors: Patrick Gloeckner, Ratingen (DE); Alessandro Cerri, Nottuln (DE); Werner Andrejewski, Dorsten (DE); Giselher Franzmann, Witten (DE); Peter Denkinger, Nottuln (DE)

(73) Assignee: Degussa AG, Dusseldorf (DE)

( * ) Notice: Subject to any disclaimer, the term of this patent is extended or adjusted under 35 U.S.C. 154(b) by 34 days.

This patent is subject to a terminal disclaimer.

(21) Appl. No.: 10/502,189

(22) PCT Filed: Feb. 15, 2003

(86) PCT No.: PCT/EP03/01535

§ 371 (c)(1),
(2), (4) Date: Jul. 22, 2004

(87) PCT Pub. No.: WO03/080703

PCT Pub. Date: Oct. 2, 2003

(65) Prior Publication Data

US 2005/0124780 A1    Jun. 9, 2005

(30) Foreign Application Priority Data

Mar. 21, 2002  (DE) .............................. 102 12 706

(51) Int. Cl.
*C08G 63/16* (2006.01)

(52) U.S. Cl. .................. 528/302; 528/303; 524/556; 524/601

(58) Field of Classification Search ................ 528/302, 528/303; 524/556, 601
See application file for complete search history.

(56) References Cited

U.S. PATENT DOCUMENTS

2004/0054075 A1 *   3/2004   Gloeckner et al. .......... 524/601
2004/0186226 A1 *   9/2004   Glockner et al. ........... 524/600

FOREIGN PATENT DOCUMENTS

| DE | 953 117    | 11/1956 |
| DE | 22 45 110  | 3/1974  |
| EP | 934 988    | 8/1999  |
| JP | 54-143494  | 11/1979 |
| WO | 89/07622   | 8/1989  |

OTHER PUBLICATIONS

Nicnas:"Adhesion resin BL 215 C", National Industrial Chemicals Notification and Assessment Scheme, No. 212, pp. 1-10 May 10, 1995.

* cited by examiner

*Primary Examiner*—Samuel A. Acquah
(74) *Attorney, Agent, or Firm*—Oblon, Spivak, McClelland, Maier & Neustadt, P.C.

(57) ABSTRACT

The invention relates to unsaturated, amorphous polyesters based on certain dicidol isomers and on saturated and/or unsaturated dicarboxylic acids.

26 Claims, No Drawings

UNSATURATED AMORPHOUS POLYESTERS BASED ON CERTAIN DICIDOL ISOMERS

The invention relates to unsaturated, amorphous polyesters based on certain dicidol isomers and acids.

Unsaturated polyester resins (UP resins) are well known. They are prepared by condensing saturated and unsaturated dicarboxylic acids or their anhydrides with diols. Their properties depend substantially on the type and ratio of the starting materials.

The bearers of the polymerizable double bonds used are usually α,β-unsaturated acids, primarily maleic acid and its anhydride or fumaric acid; unsaturated diols are of minor importance. The higher the content of double bonds, i.e. the smaller the separation of the double bonds in the chain molecules, the more reactive the polyester resin. It polymerizes very rapidly with intense development of heat and extensive contraction to give a highly crosslinked and therefore comparatively brittle end product. For this reason, the reactive double bonds in the polyester molecule are "diluted" by co-condensing saturated aliphatic or aromatic dicarboxylic acids. The alcohol components used are straight-chain and branched diols. The individual UP resin types differ not only in the components used to prepare them but also in the ratio of saturated to unsaturated acids which determines the crosslinking density in the polymerization, the degree of condensation, i.e. the molar mass, the acid number and the OH number, i.e. the type of end groups in the chain molecules, the monomer content and the type of additives (Ullmann's Encyclopedia of Industrial Chemistry, VOL A21, p. 217ff., 1992).

UP resins based on dicidol as the diol component are known, for example, from DE 924 889, DE 953 117, DE 22 45 110, DE 27 21 989, EP 114 208, EP 934 988.

It is an object of the present invention to provide novel unsaturated and amorphous polyester resins from the multiplicity of possibilities and diversity of the prior art which are also readily soluble without cloudiness in many solvents and are transparent as solids. This object is achieved as will be illustrated henceforth.

The invention provides unsaturated, amorphous polyesters substantially comprising at least one α,β-unsaturated dicarboxylic acid component and one alcohol component, wherein
the alcohol component comprises a dicidol mixture of the isomeric compounds 3,8-bis(hydroxymethyl)-tricyclo[5.2.1.0$^{2,6}$]decane, 4,8-bis(hydroxymethyl)-tricyclo[5.2.1.0$^{2,6}$]decane and 5,8-bis(hydroxymethyl)-tricyclo[5.2.1.0$^{2,6}$]decane, where each isomer may be present in the mixture in a proportion of from 20 to 40% and the sum of the three isomers is from 90 to 100%,
and at least 5% of the mixture is present in the alcohol component of the polyester.

The invention also provides a process for preparing unsaturated, amorphous polyesters substantially comprising at least one α,β-unsaturated dicarboxylic acid component and one alcohol component, wherein
the alcohol component comprises a dicidol mixture of the isomeric compounds 3,8-bis(hydroxymethyl)tricyclo[5.2.1.0$^{2,6}$]decane, 4,8-bis(hydroxymethyl)tricyclo[5.2.1.0$^{2,6}$]decane and 5,8-bis(hydroxymethyl)tricyclo[5.2.1.0$^{2,6}$]decane,
where each isomer may be present in the mixture in a proportion of from 20 to 40% and the sum of the three isomers is from 90 to 100%,
and at least 5% of the mixture is present in the alcohol component of the polyester,
by reacting the starting components at a temperature of from 150 to 270° C., preferably in an inert gas atmosphere, where the inert gas has an oxygen content of less than 50 ppm.

The unsaturated, amorphous polyester resins according to the invention are obtained by reacting the alcohol component with the acid component.

According to the invention, the alcohol component used is a dicidol mixture of the isomeric compounds 3,8-bis(hydroxymethyl)tricyclo[5.2.1.0$^{2,6}$]decane, 4,8-bis(hydroxymethyl)tricyclo[5.2.1.0$^{2,6}$]decane and 5,8-bis(hydroxymethyl)tricyclo[5.2.1.0$^{2,6}$]decane, where each isomer may be present in the mixture in a proportion of from 20 to 40% and the sum of the three isomers is from 90 to 100%, preferably from 95 to 100%, and at least 5% of the mixture is present in the alcohol component of the polyester. The isomer content of the dicidol mixture may be determined qualitatively and quantitatively, for example by GC analysis, or quantitatively by separating by means of preparative GC or HPLC and subsequent NMR spectroscopy. All corresponding isomers of dicidol in the 9-position are equally suitable but, owing to the mirror symmetry of the above mentioned isomers, like the cis- and trans-isomers, cannot be differentiated under normal, practical conditions.

The dicidol mixture may further comprise up to 10% of further isomers of dicidol and/or trimeric and/or higher isomeric diols of the Diels-Alder reaction product of cyclopentadiene. The alcohol component preferably consists of 20%, of 50%, preferably of 90%, more preferably of 100%, of dicidol mixture which more preferably comprises from 95 to 100% of the abovementioned three isomeric compounds.

In addition to the dicidol mixture, the alcohol component may comprise further linear and/or branched, aliphatic and/or cycloaliphatic and/or aromatic diols and/or polyols. The additional alcohols used are preferably ethylene glycol, 1,2- and/or 1,3-propanediol, diethylene glycol, dipropylene glycol, triethylene glycol or tetraethylene glycol, 1,2- and/or 1,4-butanediol, 1,3-butylethylpropanediol, 1,3-methylpropanediol, 1,5-pentanediol, cyclohexanedimethanol, glycerol, hexanediol, neopentyl glycol, trimethylolethane, trimethylolpropane and/or pentaerythritol.

The starting acid component present in the unsaturated, amorphous polyester resins according to the invention comprises at least one α,β-unsaturated dicarboxylic acid. The unsaturated polyester resins preferably comprise citraconic acid, fumaric acid, itaconic acid, maleic acid and/or mesaconic acid.

In addition, aromatic and/or aliphatic and/or cycloaliphatic monocarboxylic acids and/or dicarboxylic acids and/or polycarboxylic acids may also be present, for example phthalic acid, isophthalic acid, terephthalic acid, 1,4-cyclohexanedicarboxylic acid, succinic acid, sebacic acid, methyltetrahydrophthalic acid, methylhexahydrophthalic acid, hexahydrophthalic acid, tetrahydrophthalic acid, decanedicarboxylic acid, adipic acid, azelaic acid, isononanoic acid, 2-ethylhexanoic acid, pyromellitic acid and/or trimellitic acid. Preference is given to phthalic acid, hexahydrophthalic acid, tetrahydrophthalic acid, 1,4-cyclohexanedicarboxylic acid, adipic acid and/or azelaic acid.

The acid component may partly or entirely consist of anhydrides and/or alkyl esters, preferably methyl esters.

In general, the alcohol component is present in a molar ratio of from 0.5:1 to 2.0:1 to the acid component, preferably from 0.8:1 to 1.5:1. The reaction of the alcohol component more preferably takes place in a molar ratio of from 1.0:1 to 1.1:1 to the acid component.

The unsaturated, amorphous polyesters according to the invention may have an acid number of from 1 to 200 mg KOH/g, preferably from 1 to 100 mg KOH/g, more preferably from 1 to 50 mg KOH/g, and an OH number of from 1 to 200 mg KOH/g, preferably from 1 to 100 mg KOH/g, more preferably from 1 to 50 mg KOH/g.

The Tg of the unsaturated, amorphous polyesters according to the invention varies from −30 to +80° C., preferably from −20 to +50° C., more preferably from −10 to +40° C.

In one preferred embodiment I, the unsaturated polyesters (UP resins) according to the invention consist of an alcohol component comprising at least 90%, preferably 95%, more preferably 100%, of the dicidol mixture of the isomeric compounds 3,8-bis-(hydroxymethyl)tricyclo[5.2.1.0$^{2,6}$]decane, 4,8-bis-(hydroxymethyl)tricyclo[5.2.1.0$^{2,6}$]decane and 5,8-bis-(hydroxymethyl)tricyclo[5.2.1.0$^{2,6}$]decane, and of fumaric acid and/or maleic acid/anhydride. In a further preferred embodiment II, the polyesters comprise the above-mentioned starting components as under I, but additionally a further acid selected from adipic acid and phthalic acid/anhydride, where the ratio of α,β-unsaturated acid to the additional acid may vary from 2:1 to 1:4. Preference is given to ratios of approx. 1:1 to 1:2. These polyesters generally have acid numbers of from 1 to 200 mg KOH/g, preferably 1–100 mg KOH/g, more preferably 1–50 mg KOH/g, OH numbers of from 1 to 200 mg KOH/g, preferably 1–100 mg KOH/g, more preferably 1–50 mg KOH/g, and a Tg of from −30 to +80° C., preferably from −20 to +50° C., more preferably from −10 to +40° C.

The polyesters according to the invention may also comprise assistants and additives which are selected from inhibitors, water and/or organic solvents, neutralizing agents, surface-active substances, oxygen scavengers and/or radical scavengers, catalysts, light stabilizers, color brighteners, photosensitizers, thixotropic agents, antiskinning agents, defoamers, antistats, thickening agents, thermoplastic additives, dyes, pigments, flame retardants, internal release agents, fillers and/or blowing agents.

The polyesters according to the invention are prepared by (semi)continuous or batchwise esterification of the starting acids and alcohols in a one-stage or two-stage procedure.

The process according to the invention, as described above, is preferably operated in an inert gas atmosphere at from 150 to 270° C., preferably from 160 to 230° C., more preferably from 160 to 200° C. The inert gas used may be nitrogen or a noble gas, in particular nitrogen. The inert gas has an oxygen content of less than 50 ppm, in particular less than 20 ppm.

The polyester resins according to the invention are further illustrated by the examples which follow:

EXAMPLES

Starting component: dicidol mixture (claim 1) in an isomeric ratio of approximately 1:1:1

Example 1

Decanedicarboxylic acid and fumaric acid (ratio 0.6:0.4) are reacted with dicidol in a ratio of 1:1.05 at 180° C. in a nitrogen atmosphere until an acid number of 24 mg KOH/g and an OH number of 34 mg KOH/g are attained. To this end, the fumaric acid is initially esterified with dicidol over the course of one hour and then the dodecanedicarboxylic acid is added. $M_n$=2200 g/mol, $M_w$=5500 g/mol, glass transition temperature 4° C.

Example 2

Adipic acid and maleic acid (ratio 1:1) are reacted with dicidol in a ratio of 1:1.05 at 180° C. in a nitrogen atmosphere until an acid number of 26 mg KOH/g and an OH number of 37 mg KOH/g are attained. To this end, the maleic acid is initially esterified with dicidol over the course of one hour and then the adipic acid is added. $M_n$=1800 g/mol, $M_w$=4300 g/mol, glass transition temperature 12° C.

The invention claimed is:

1. An unsaturated, amorphous polyesters, comprising:
   at least one α,β-unsaturated dicarboxylic acid component; and
   one alcohol component,
   wherein the alcohol component comprises a dicidol mixture of isomeric compounds 3,8-bis(hydroxymethyl)-tricyclo[5.2.1.0$^{2,6}$]decane, 4,8-bis(hydroxymethyl)-tricyclo [5.2.1.0$^{2,6}$]decane, and 5,8-bis-hydroxymethyl) tricyclo[5.2.1.0$^{2,6}$]decane,
   wherein each isomeric compound is present in the dicidol mixture in a proportion of from 20 to 40% and a sum of the three isomeric compounds is from 90 to 100%, and
   wherein at least 5% of the dicidol mixture is present in the alcohol component of the polyester.

2. The unsaturated, amorphous polyester as claimed in claim 1, further comprising up to 10% of isomers selected from the group consisting of a dicidol, a trimeric diol, a higher isomeric diol of a Diels-Alder reaction product of a cyclopentadiene, and a combination thereof.

3. The unsaturated, amorphous polyester as claimed in claim 1, wherein the acid component further comprises at least one member selected from the group consisting of an aromatic monocarboxylic acid, an aromatic dicarboxylic acid, an aromatic polycarboxylic acid, an aliphatic monocarboxylic acid, an aliphatic dicarboxylic acid, an aliphatic polycarboxylic acid, a cycloaliphatic monocarboxylic acid, a cycloaliphatic dicarboxylic acid, a cycloaliphatic polycarboxylic acid and mixtures thereof.

4. The unsaturated, amorphous polyester as claimed in claim 1, wherein the acid component comprises partly or entirely at least one member selected from the group consisting of an anhydride, an alkyl ester and mixtures thereof.

5. The unsaturated, amorphous polyester as claimed in claim 1, wherein the alcohol component further comprises at least one member selected from the group consisting of a linear diol, a branched diol, an aliphatic diol, a cycloaliphatic diol, an aromatic diol, a linear polyol, a branched polyol, an aliphatic polyol, a cycloaliphatic polyol, an aromatic polyol and mixtures thereof.

6. The unsaturated, amorphous polyester as claimed in claim 1, wherein the α,β-unsaturated dicarboxylic acid comprises at least one member selected from the group consisting of a citraconic acid, a fumaric acid, an itaconic acid, a maleic acid, a mesaconic acid and mixtures thereof.

7. The unsaturated, amorphous polyester as claimed in claim 1, further comprising at least one member selected from the group consisting of a phthalic acid, an isophthalic acid, a terephthalic acid, a 1,4-cyclohexanedicarboxylic acid, a succinic acid, a sebacic acid, a methyltetrahydrophthalic acid, a methylhexahydrophthalic acid, a hexahydrophthalic acid, a tetrahydrophthalic acid, a dodecanedicarboxylic acid, an adipic acid, an azelaic acid, an isononanoic acid, a 2-ethylhexanoic acid, a pyromellitic acid, a trimellitic acid, an anhydride of a phthalic acid, an anhydride of an isophthalic acid, an anhydride of a terephthalic acid, an anhydride of a 1,4-cyclohexanedicarboxylic acid, an anhydride of a succinic acid, an anhydride of a sebacic acid, an anhydride of a methyltetrahydrophthalic acid, an anhydride of a methylhexahydrophthalic acid, an anhydride of a hexahydrophthalic acid, an anhydride of a tetrahydrophthalic acid, an anhydride of a dodecanedicarboxylic acid, an anhydride of an adipic acid, an anhydride of an azelaic acid, an anhydride of an isononanoic acid, an anhydride of a 2-ethylhexanoic acid, an anhydride of a pyromellitic acid, an anhydride of a trimellitic acid, a methyl ester of a phthalic acid, a methyl ester of an isophthalic acid, a methyl ester of a terephthalic acid, a methyl ester of a 1,4-cyclohexanedicarboxylic acid, a methyl ester of a succinic acid, a methyl ester of a sebacic acid, a methyl ester of a methyltetrahydrophthalic acid, a methyl ester of a methylhexahydrophthalic acid, a methyl ester of a hexahydrophthalic acid, a methyl ester of a tetrahydrophthalic acid, a methyl ester of a dodecanedicarboxylic acid, a methyl ester of an adipic acid, a methyl ester of an azelaic acid, a methyl ester of an isononanoic acid, a methyl ester of a 2-ethylhexanoic acid, a methyl ester of a pyromellitic acid, a methyl ester of a trimellitic acid and mixtures thereof.

8. The unsaturated, amorphous polyester as claimed in claim 1, further comprising at least one member selected from the group consisting of an ethylene glycol; a 1,2-propanediol; 1,3-propanediol; diethylene; dipropylene; triethylene glycol; tetraethylene glycol; 1,2-butanediol; 1,4-butanediol; 1,3-butylethylpropanediol; 1,3-methylpropanediol; 1,5-pentanediol; cyclohexanedimethanol; glycerol; hexanediol; neopentyl glycol; trimethylolethane; trimethylolpropane; pentaerythritol and mixtures thereof.

9. The unsaturated, amorphous polyester as claimed in claim 1, wherein at least 20% of the alcohol component comprises the isomeric compounds.

10. The unsaturated, amorphous polyester as claimed in claim 1, wherein at least 50% of the alcohol component comprises the isomeric compounds.

11. The unsaturated, amorphous polyester as claimed in claim 1, wherein at least 90% of the alcohol component comprises the isomeric compounds.

12. The unsaturated, amorphous polyester as claimed in claim 1, wherein at least 100% of the alcohol component comprises the isomeric compounds.

13. The unsaturated, amorphous polyester as claimed in claim 1, wherein the α,β-unsaturated acid component comprises at least one member selected from the group consisting of a fumaric acid; a maleic acid; a maleic anhydride and mixtures thereof.

14. The unsaturated, amorphous polyester as claimed in claim 1, wherein the dicarboxylic acid component further comprises at least one member selected from the group consisting of an adipic acid; a phthalic acid; a phthalic anhydride and mixtures thereof.

15. The unsaturated, amorphous polyester as claimed in claim 1, wherein the alcohol component is present with respect to the acid component in a molar ratio of from 0.5:1 to 2.0:1.

16. The unsaturated, amorphous polyester as claimed in claim 1, wherein the alcohol component is present with respect to the acid component in a molar ratio of from 0.8:1 to 1.5:1.

17. The unsaturated, amorphous polyester as claimed in claim 1, wherein the alcohol component is present with respect to the acid component in a molar ratio of from 1.0:1 to 1.1:1.

18. The unsaturated, amorphous polyester as claimed in claim 1, which has an acid number of from 1 to 200 mg KOH/g.

19. The unsaturated, amorphous polyester as claimed in claim 1, which has an OH number of from 1 to 200 mg KOH/g.

20. The unsaturated, amorphous polyester as claimed in claim 1, further comprising an assistant and/or an additive.

21. The unsaturated, amorphous polyester as claimed in claim 20, wherein at least one assistant and/or at least one additive are selected from the group consisting of an inhibitor, a water, an organic solvent, a neutralizing agent, a surface-active substance, an oxygen scavenger, a radical scavenger, a catalyst, a light stabilizer, a color brightener, a photosensitizer, a thixotropic agent, an anti-skinning agent, a defoamer, an antistat, a thickening agent, a thermoplastic additive, a dye, a pigment, a flame retardant, an internal release agent, a filler, and a blowing agent.

22. The unsaturated, amorphous polyester as claimed in claim 1, wherein the alcohol component comprises:
at least 90% of the dicidol mixture, and
fumaric acid, maleic acid, maleic anhydride or mixtures thereof are present in a diol/acid ratio of from 0.9:1 to 1.1:1.

23. The unsaturated, amorphous polyester as claimed in claim 22, wherein the alcohol component further comprises at least one member selected from the group consisting of an adipic acid, a phthalic acid, a phthalic anhydride, and mixtures thereof in a ratio of α,β-unsaturated to additional acid of from 3:1 to 1:4.

24. A process for preparing unsaturated, amorphous polyesters, comprising:
providing at least one α,β-unsaturated dicarboxylic acid component;
providing an alcohol component that comprises a dicidol mixture of isomeric compounds including 3,8-bis(hydroxymethyl)tricyclo[5.2.1.0$^{2,6}$]decane, 4,8-bis(hydroxymethyl)tricyclo[5.2.1.0$^{2,6}$]decane, and 5,8bis-(hydroxymethyl)tricyclo[5.2.1.0$^{2,6}$]decane, wherein each isomeric compound is proportionally present in the dicidol mixture from 20 to 40% and a sum of the three isomeric compounds is proportionally present in the dicidol mixture from 90 to 100%; and
reacting the α,β-unsaturated dicarboxylic acid component with the alcohol component at a temperature from 150 to 270° C. so that at least 5% of the dicidol mixture is present in the alcohol component of the polyester.

25. The process as claimed in claim 24, wherein reacting is effected in an atmosphere of an inert gas.

26. The process as claimed in claim 25, wherein the inert gas has an oxygen content of less than 50 ppm.

* * * * *